(12) United States Patent
Lee-Smith

(10) Patent No.: US 11,157,395 B2
(45) Date of Patent: Oct. 26, 2021

(54) AUTOMATED TEST COVERAGE OF COMPUTING SYSTEMS

(71) Applicant: Arm Limited, Cambridge (GB)

(72) Inventor: Andrew Jonathan Robert Lee-Smith, Ormskirk (GB)

(73) Assignee: ARM LIMITED, Cambridge (GB)

( * ) Notice: Subject to any disclaimer, the term of this patent is extended or adjusted under 35 U.S.C. 154(b) by 126 days.

(21) Appl. No.: 16/545,847

(22) Filed: Aug. 20, 2019

(65) Prior Publication Data

US 2020/0104243 A1 Apr. 2, 2020

(30) Foreign Application Priority Data

Sep. 28, 2018 (GB) ..................................... 1815849

(51) Int. Cl.
*G06F 11/00* (2006.01)
*G06F 11/36* (2006.01)

(52) U.S. Cl.
CPC ...... *G06F 11/3684* (2013.01); *G06F 11/3688* (2013.01)

(58) Field of Classification Search
CPC .......................... G06F 11/3684; G06F 11/3688
See application file for complete search history.

(56) References Cited

U.S. PATENT DOCUMENTS

| | | |
|---|---|---|
| 9,916,230 B1 | 3/2018 | Huang et al. |
| 2010/0169853 A1 | 7/2010 | Jain et al. |
| 2013/0339930 A1* | 12/2013 | Xu ...................... G06F 11/3684 717/125 |

OTHER PUBLICATIONS

Combined Search and Examination Report issued in GB Application No. 1815849.3, dated Mar. 27, 2019, 9 pages.

* cited by examiner

*Primary Examiner* — Katherine Lin
(74) *Attorney, Agent, or Firm* — Talem IP Law, LLP

(57) ABSTRACT

A method for displaying visual representation of test case coverage is described. A computer-implemented method can include receiving updates during test case runtime to generate a tree that represents a hierarchical ordering of test cases within related branches, providing a test coverage map of the tree in a form of a tree representation; receiving a request through interaction with a node of the tree representation, and performing operation corresponding to the request. In some cases, a tree may include nodes representing completed tests and nodes representing incomplete accepted tests. The nodes representing completed tests and the nodes representing incomplete accepted tests each include one or more tags that represent the environment in which a piece of functionality is tested. Percentage completion can be based on the number of completed test cases to the number of incomplete accepted test cases.

20 Claims, 13 Drawing Sheets

AUTOMATED TEST COVERAGE OF COMPUTING SYSTEMS

BACKGROUND

Automated testing involves software that controls the execution of tests of components (hardware and/or software) to identify inefficiencies or defects in a software or hardware product. Automated testing may be periodically performed to identify and fix issues at early stage of application development. A product developer may receive complaints or test case requests from customers and then design a test to uncover that feature. For example, using an issue tracking product that provides bug tracking, issue tracking, and project management functions, test case tickets may be issued when a request comes in from a customer, and requirements (e.g., requirement tickets) are matched to test case tickets. Keeping track of the test cases and the tickets may be carried out using spreadsheets and coverage matrixes. However, these documents often require manual updating and may not be easily accessible or up-to-date. In addition, the results of automated testing are generally hidden away in documents and not easily available to those that may like to review the results or determine whether the tests are covering the aspects they find important.

BRIEF SUMMARY

Automated test coverage with a tree representation of test coverage information is described herein. The described tree representation and corresponding methods can present a testing condition of an application to the public who can navigate and modify the tree representation via an interactive user interface.

A computer-implemented method can include receiving updates during test case runtime to generate a tree that represents a hierarchical ordering of test cases within related branches, providing a test coverage map of the tree in a form of a tree representation; receiving a request through interaction with a node of the tree representation, and performing operation corresponding to the request. In some cases, a tree may include nodes representing completed tests and nodes representing incomplete accepted tests. Each node can include one or more tags that represent the environment in which a piece of functionality is tested.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Automated test coverage with a tree representation of test coverage information is described herein. The described tree representation and corresponding method can capture and display automated test coverage information by presenting an interactive user interface to public who can navigate and modify a tree.

Validation or Quality Assurance Engineers are often asked to produce a coverage matrix or map of test coverage. The described automated test coverage of computing systems enables a user community to view the coverage map. For example, a support engineer can quickly see if an issue a customer is seeing is covered; engineers and customers may point out missing tests and indicate the features that are important to them (and not just the validation team of the company). The described systems enable a view of a percentage coverage based on a community coverage map and identify where testing is weak and where testing is strong through a heat map.

Figure 1:
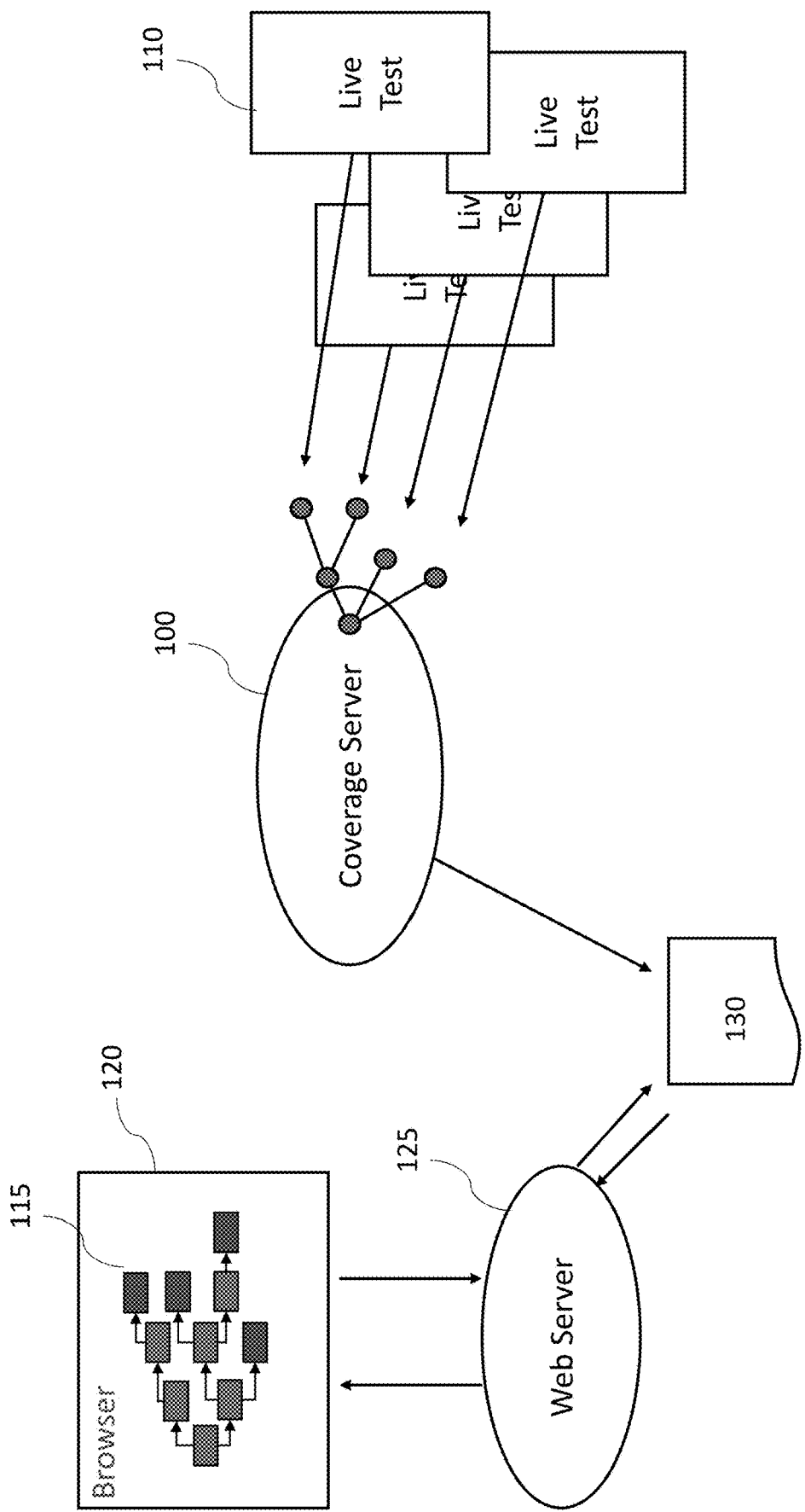
FIG. 1 illustrates an example coverage tree architecture.

FIG. 1 illustrates an example coverage tree architecture. The coverage map can be in the form of a coverage tree that supports highly multi-dimensional environments. The coverage tree represents functionality that is tested via the configurations specified by the one or more tags in certain nodes. The tests themselves are appended with code that adds nodes to a tree (the coverage tree) as the tests are run. The test code includes the test environment as tags on each node added to the tree such that the node indicates the piece(s) of functionality the test exercises and in what situation. For example, in pseudocode, test code can include the following:

```
# Test code
import coveragelibrary
AddNode (NodeName, Parent, {Environment}).
```

A coverage server 100 receives the test information (e.g., a node name (NodeName), a parent node name (Parent), and environment information (Environment)) from the various tests 110 which may be executing on any suitable processor or system. The environment may be represented as tags associated with the node. Although referred to as "tags", the form in which a node includes the environment information may be any suitable format as known in the art. The resultant tree that is generated by the tests adding the nodes can be accessed via, for example a web page 115 in a browser 120. Communication of the coverage map and various commands from the user interface for the web page 115 can be carried out between a web server 125 and the coverage server 100. In some cases, the coverage map (e.g., in file 130 for web page 115) can be communicated from the coverage server 100 in the form of, for example, a JSON file. The tree can be initially be developed as a base tree. The base tree is designed for a particular product and forms the base on which nodes from tests are added. The resultant tree generated by the tests adding nodes can be accessed and interacted with via a web page rendered in a browser or via a specific purpose application.

Figure 2A:
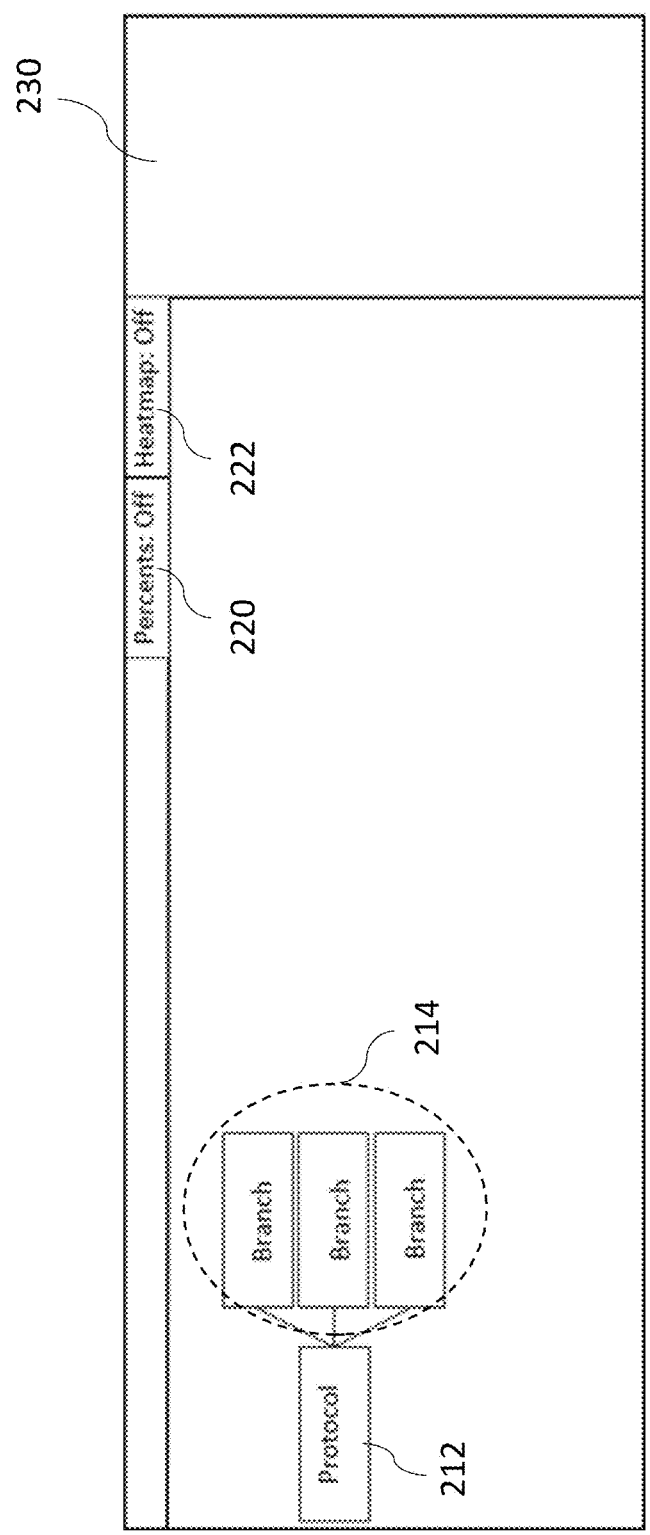
FIGS. 2A-2C illustrate a process by which a user can navigate an interactive tree showing test case relationships and completion.
Figure 2B:
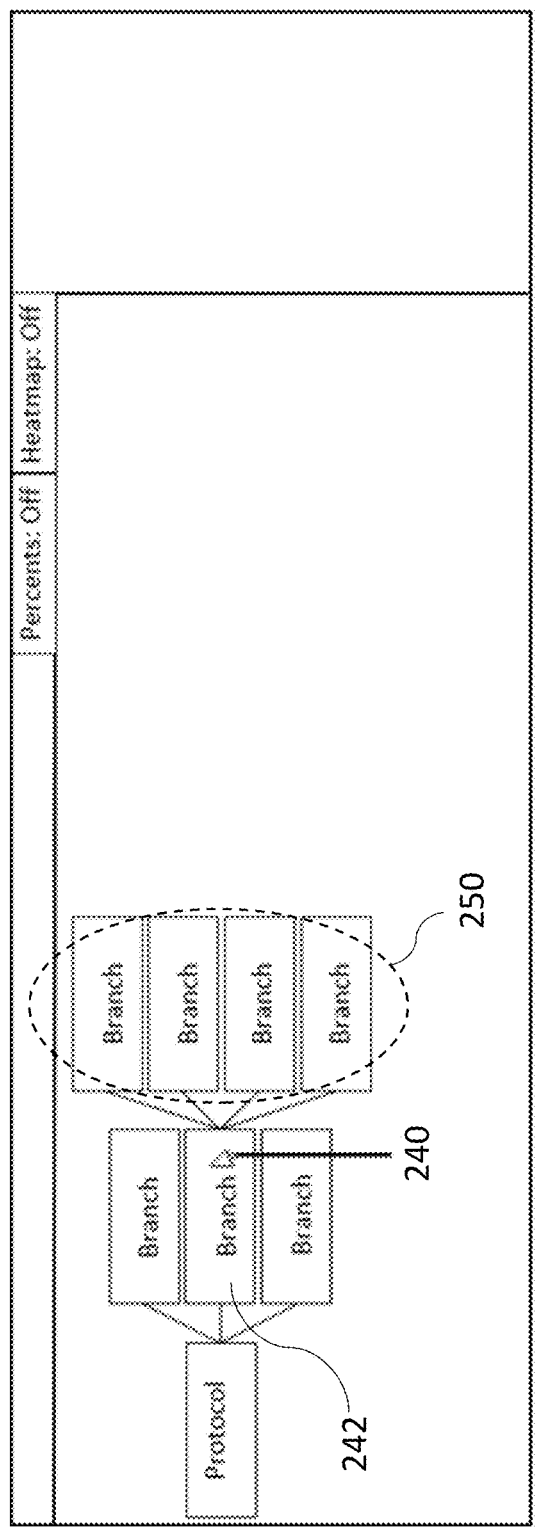
Figure 2C:
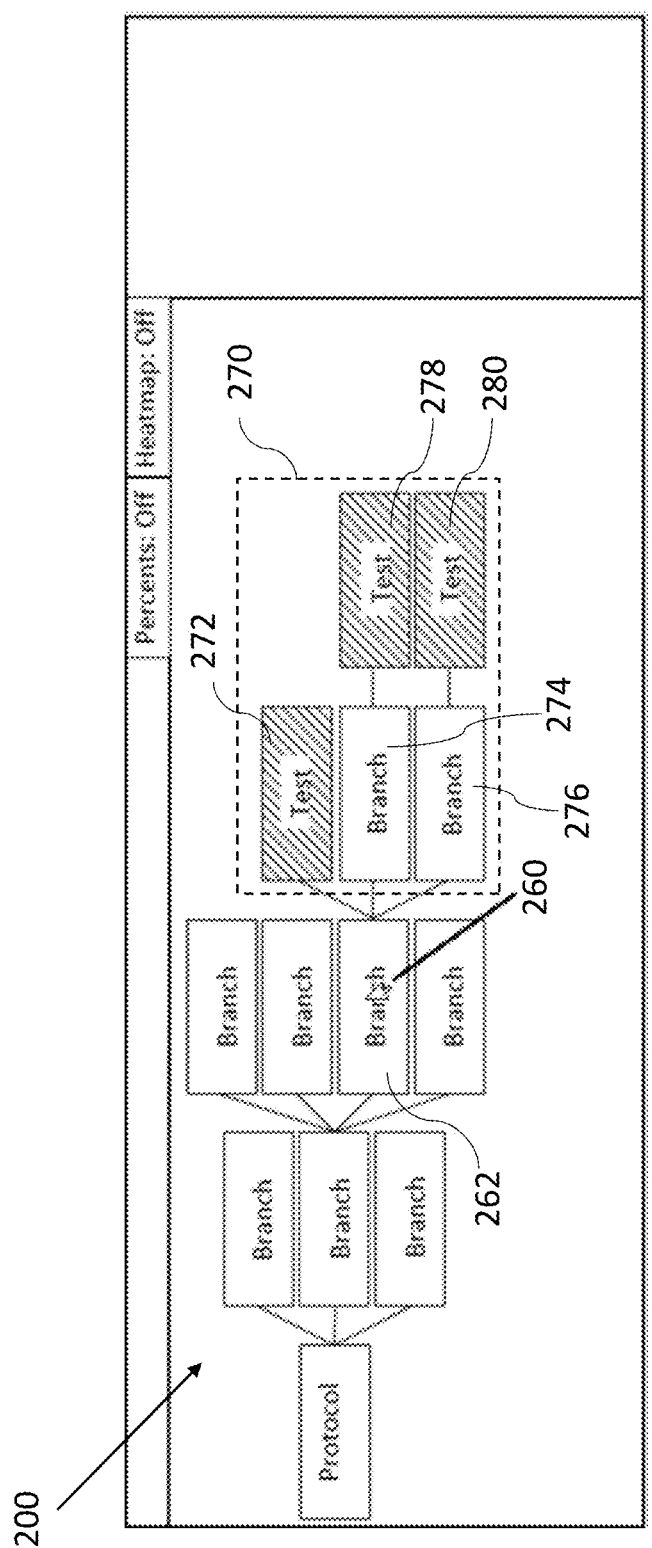

FIGS. 2A-2C illustrate a process by which a user can navigate an interactive tree showing test case relationships and completion. FIG. 2A shows an example interface, including a compact view representation of a tree illustrating a system. As mentioned above, a base tree can be designed for the particular system. The tree can include a representation of test cases—specific functionality tests—according to a certain organizational schema. This schema can focus on the relational nature of test cases by organizing together test cases with similar functionality or using similar hardware (e.g., as a "collection of test cases"). The individual test cases are used to test different aspects of functionality of software and/or hardware. Each "test case" can be anything from specific pieces of functionality to larger, more abstract, functionality; and test cases may be grouped into collections of related tests (and represented, for example, as children of a same parent node). The visual aspects of the interface can vary—the borders, coloration, presence of text, number of branches, and depth of the tree are all aspects that can change, and FIG. 2A shows only one possible representative implementation.

By making the tree visible through an interface (e.g., via a browser), it is potentially visible available to anyone. Since the tree is structured in a hierarchical and logical way, individual features can be quickly found and the testing performed ascertained along with the exact context. This is very useful for support engineers and customers as they can determine if the feature they are interested in is tested and in what context, thus building confidence in the product feature.

The interface itself can have several features. The visual representation of the test cases—or the visualization mode—can be one part. The test cases can be represented by a data structure, including a space tree representation. This data structure is advantageous as it automatically compacts the tree, allowing users to focus on the tests and branches that they find most interesting or useful, and the tree representation befits the relational representation that allows for a simple understanding of the general-to-specific relationships. As such, a space tree will be used as an example from here onwards. The interface also can include various icons that, when selected, modify the view such as the percent 220 and heatmap 222 buttons. These icons can be toggled between various modes that affect the interface in different ways and to different degrees. A specific implementation of a use of one of these modes can be seen in FIG. 5. The interface can also include a separate pane 230. This pane can be used to view more detailed information about the other parts of the interface, offer up options related to other aspects of the interface, or other functionality that allows for seamless interaction with other parts of the interface. A specific use of this pane can be seen in FIG. 4.

The visual representation of the tree can have various aspects. The interface can initialize with the tree in a compact view of the tree. This view can include only the root 212 of the tree, which can represent the program or protocol itself, and the primary branches 214, which can represent the most fundamental aspects of the program or protocol. This view can support traversal of the tree, for instance by selecting branches to expand, as shown in FIG. 2B, or collapse of branches. Collapse is not shown, but can be done in a manner similar to traversal—selecting an expanded branch with a mouse or pointer could cause the system to collapse the branch. The tree can contain many children branches within the primary branches, which may themselves include children branches. The number of branches and the depth of these children branches does not have to be fixed. The tree also can include leaf nodes, some of which can represent individual test cases. A node (leaf or branch node) can include multiple tags that represent the environment in which a piece of functionality is tested.

The test cases represented by the nodes (and even at the granularity of a tag) can be visually differentiated between completed test cases—cases for which a successfully implemented test has been run—incomplete accepted test cases—cases which have been accepted as legitimate, but for which either a successful result has not been obtained or a test has not been written—and suggested test cases—cases which have been submitted for consideration and possible implementation, but which have not yet been accepted or had a test implemented. There are a number of ways to differentiate these categories of test cases, including color, either of the text or box, pattern of the box, shape of the box, font of the text, or weight of the text. The process for requesting and accepting test cases is detailed in FIG. 3.

FIG. 2B illustrates how the tree can be traversed. A user can use a mouse or other pointer to select (240) a particular branch 242. To begin traversing beyond the initial compact view, a primary branch can be selected, and the functionality can persist for children branches. Once the parent branch is selected, any children branches 250 could be revealed and connected visually to the parent branch, for example by having lines that connect the two.

FIG. 2C illustrates an expanded view of the tree 200. Eventually, a branch 262 can be selected by a mouse or pointer (260) that includes only leaf nodes or child branches that includes only leaf nodes—where no further expansion is possible, resulting in an expanded form of the tree representation. These nodes and branches extending from branch 262 can be considered in more detail and in some cases be viewed in isolation. For example, branch node 262 can be selected as the "root node" for the view and any nodes or branches that extend from that branch (e.g., labeled in region 270 for branch 262) can be viewed in isolation. Here, branch node 262 is a parent node of leaf node 272 and nodes 274, 276 that themselves are parent nodes of leaf nodes 278, 280 respectively.

Figure 3A:
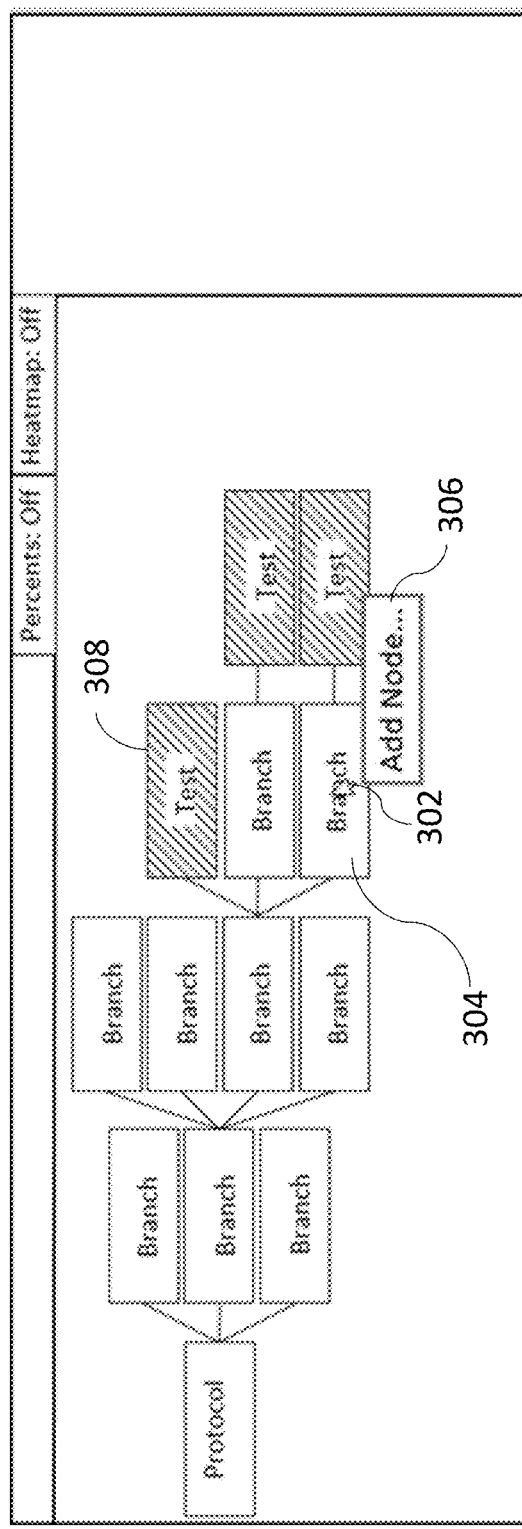
FIGS. 3A-3D illustrate a process by a new test case can be added to the tree without leaving the visualization mode.

FIGS. 3A-3D illustrate a process by which a new test case can be added to the tree without leaving the visualization mode. At some point, a user might realize a functionality that interests them is not currently tested. As an illustrative scenario, a user may notice that a particular feature is not tested, or not tested in the particular context they are using and at this point can manually add a 'feature' node or 'context' tag to an existing node. In some cases, an interface is provided that includes an easy way for them to voice their interest in the form of creating a suggested test case. FIG. 3A illustrates the beginning of this process. A user can select a branch node 304 with their mouse or pointer (302). While not necessary, this selection can be different than the selection which would expand the branch, such as with a right click, in order to differentiate it from a traversal command. This selection can prompt a menu 306 or text box to appear that indicates the option to add an extra node such as a leaf node (an "adding request"). When adding an extra node, the user indicates the specific environment of the test through one or more tags. As mentioned above, a node includes one or more tags which represent the environment in which a piece of functionality is tested.

For example, in a scenario where a car breaking test is being added, a test can be used to ensure that the car stops within a certain distance from a certain speed. The specific functionality of the test is "stopping distance", which can be used as the label of the leaf node. The environment for the test can include temperature, wet or dry conditions, starting speed, tire type, desired stopping distance, etc., and this specific environment can be defined by one or more tags of the leaf node.

One test may be run many times each with a different set of environmental parameters as defined by the tags. For example, in the car breaking test scenario, the test may be run for a range of temperatures.

In addition to requesting to add a new leaf node, a user can request to add a tag to an existing leaf node (or branch node). One mechanism to add tags to an existing node may be similar as the mechanism used to add a new leaf node. For example, similar interaction with leaf node 308 as with branch 304 can prompt a menu or text box (not shown) that indicates an option to add or even modify a tag of leaf node 308.

Figure 3B:
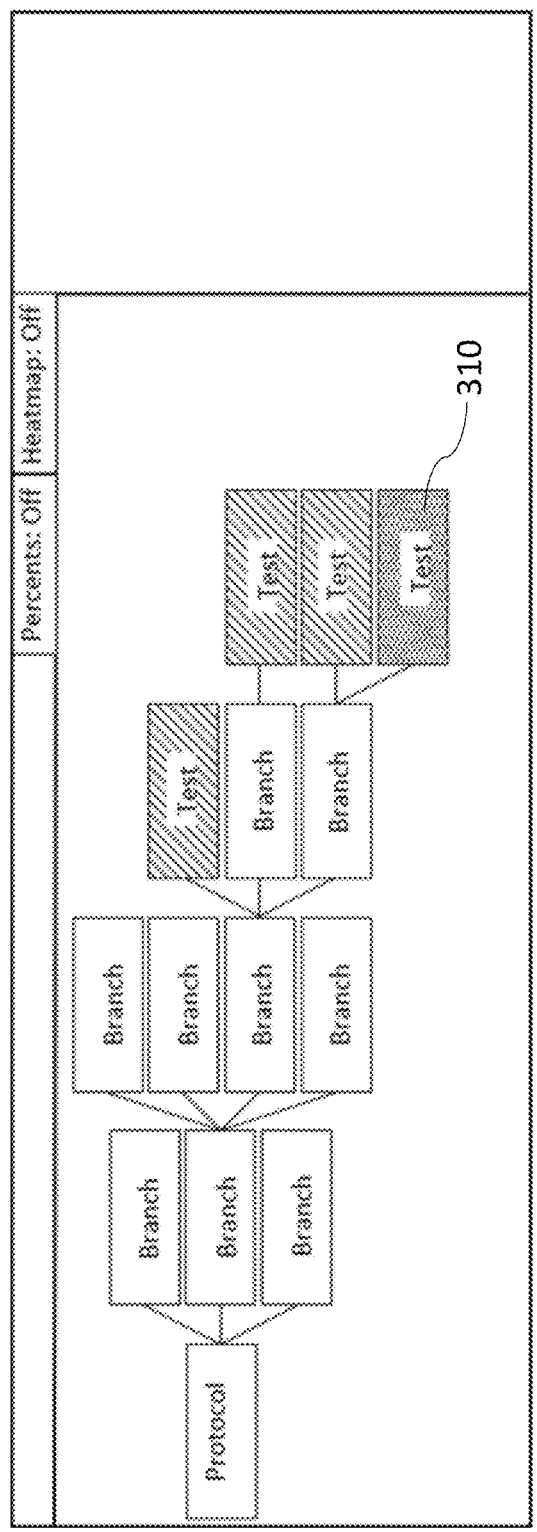

After this request is processed, a new node 310 is created on the server tree as shown in FIG. 3B. This new node can be considered a suggested test case. Similarly, when a new tag request is processed, the tag information can be considered a suggested test parameter and the leaf node can be updated to include the suggested test parameter. There are also various implementations for viewing suggested test cases (and suggested test parameters), including suggested test cases being visible to only the developers, suggested test cases being visible also to the users who submitted the suggestion, and suggested test cases being visible to all users. As each of these implementations are advantageous, there can be a toggle switch, akin to 220 and 222, to toggle between these visibilities.

Figure 3C:
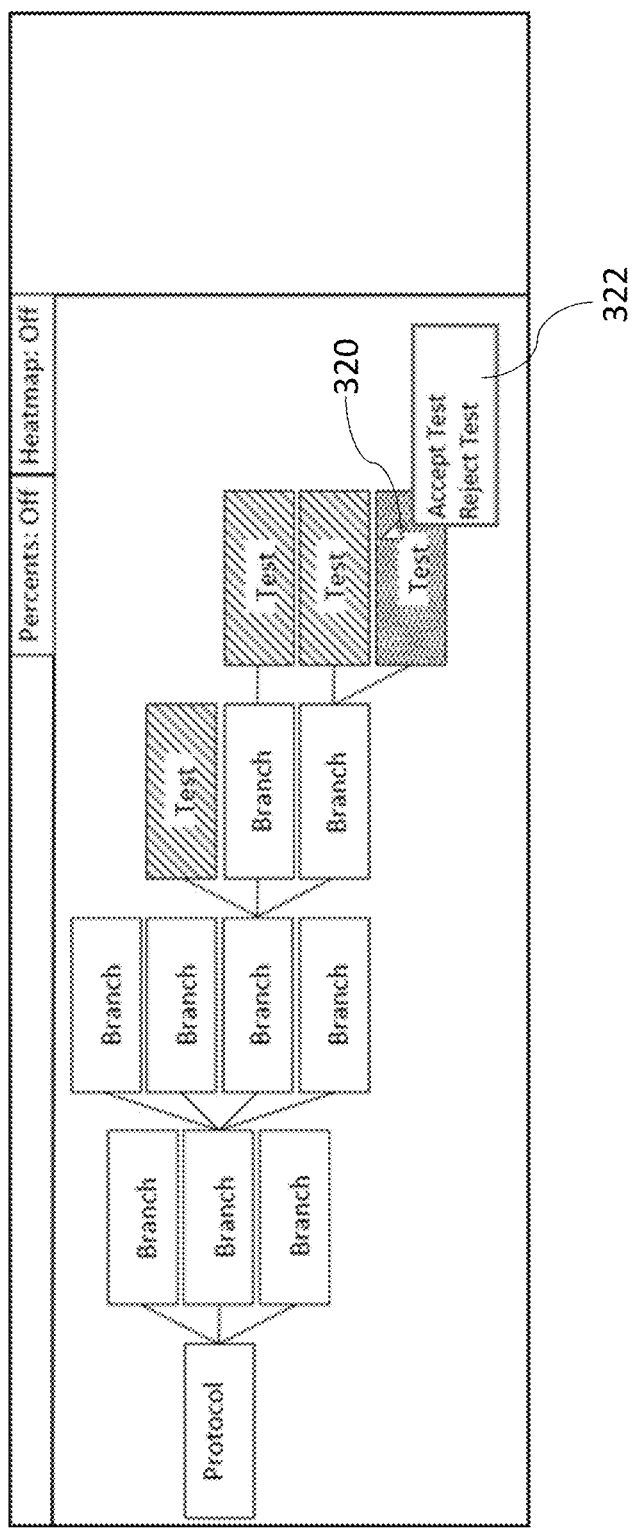

FIG. 3C then shows how a test is accepted. A developer can view the tree and might see a suggested test case (or suggested test parameter). If the developer thinks the test case merits implementation, they can select the suggested test case 310 with their mouse or pointer (320). As with creating the test case, a different method of selection, such as a right click, might advantageous for the purposes of interfacing to accept the test. This selection can prompt a menu 322 or text box to appear that indicates the option to accept the test. Optionally, this menu can include the option to reject a test to indicate that the suggestion has been considered. From this menu, the developer can select to accept the test.

Figure 3D:
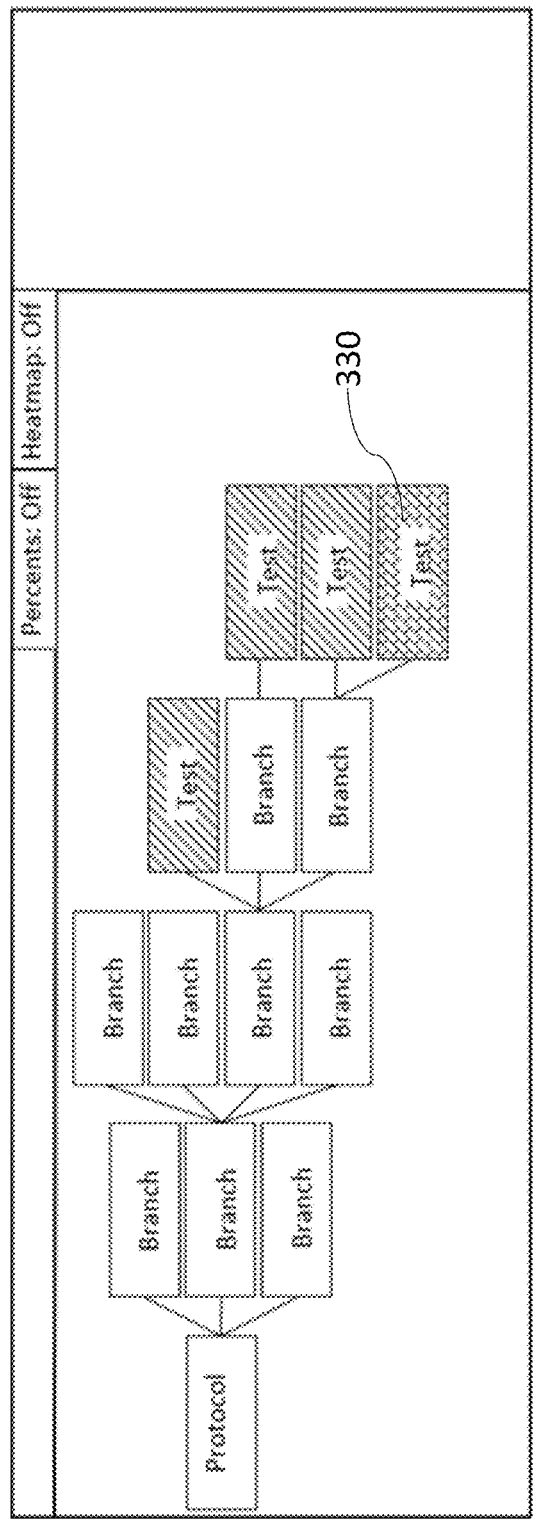

FIG. 3D shows the result of a developer choosing to accept a suggested test case. The suggested test case would change from a suggested test case (e.g., 310) to an incomplete accepted test case 330 and could thus change visually. An "incomplete accepted test" is a test with at least one tag parameter that has been accepted, but not yet completed (and run). The change to an incomplete accepted test case can communicate to the users that the developers are aware that the testing of this functionality is requested and that they recognize the request as legitimate. This change might also represent their intent to work on the test case imminently.

Once a user adds a new node (with corresponding tags) or new tag, the user coverage tree diverges from the generated tree. Over time, a user community coverage tree will be generated focusing on what is important to the users. When the tree diverges from the test generated tree, coverage statistics can be obtained by comparing the number of tags and nodes in each tree. Test coverage information can also be obtained for different branches of the coverage tree allowing easy viewing of test coverage information for different sections of the product. As mentioned above, an incomplete accepted test is a test with at least one tag parameter that has been accepted, but not yet completed (and run). Thus, in some cases, when calculating a total number of tests for test coverage information, the number of tags are considered.

Figure 4:
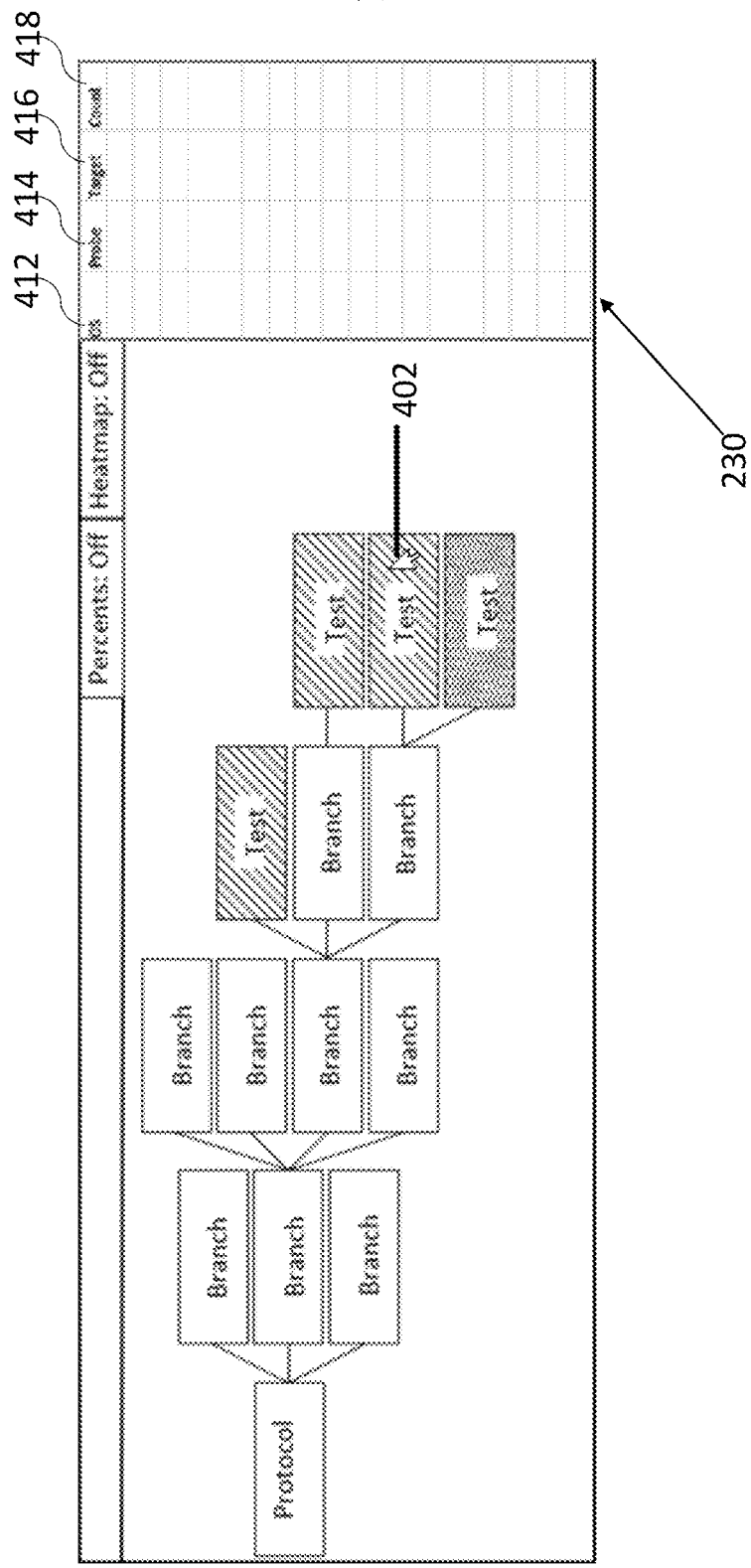
FIG. 4 illustrates a view of the interface that details how test information that can be interactively viewed.

FIG. 4 illustrates a view of the interface that details how test information that can be interactively viewed. A user might be interested in the specifics of a test case. Thus, inclusion of these specifics can be advantageous for the user experience. In some cases, an interface is provided that includes a method to allow information to be viewed without leaving the visualization mode. A particular test, for instance represented at node 278, can be selected by a mouse or pointer (402). This can prompt the system to display, in the separate pane 230, information about the test. In some cases, the information is directly associated with the tags indicating the specific environment of the test. The information can be presented in the form of a table, which provides the list of tags a node has. For example, in one case, this information can include information about the OS 412, probe 414, and target 416. In another example, such as in the scenario of the test case for the car break test of stopping distance, the information can include information about the temperature, conditions, starting speed, tire type, and stopping distance. As mentioned above, each time a test is run with a different environment configuration, a new tag is added to the test case node (and represented as a new row in the table).

In some cases, count 418 can be included. Count refers to the number of times the particular functionality has been tested with those environmental parameters. Count 418 is a useful value as it provides information regarding how many times a particular piece of functionality is tested during each test period. Indeed, the system can track a count of a number of times a particular test environment for a particular piece of functionality is represented in the tree during a test period in which test case runtime occurs to generate the tree (e.g., the test period may be a 24 hour period, a 2 hour period, or a longer or shorter period depending on the length of time to run the tests. Ideally, each functional test/environmental combination would be run only once, but multiple tests may test the same functionality with the same environment and "count" captures this information. In some cases, the count can be fed back to the test triggering/scheduling system so that the optimum collection of tests can be run to achieve the same functionality coverage outcome. For example, when there is a count value greater than 1, the test run can be corrected so that there is a count value of 1 the next time the tests are run. Each test having a count of '1' the next time the tests are run would reduce the overall test time but with no loss of test coverage. As an example, when the count is greater than 1, the system can automatically adjusts tests to be run during a subsequent test period to remove one or more tests contributing to the count. An optimization module may perform the processes to determine which of the tests testing the same particular piece of functionality in the same particular environment to remove from the subsequent test runs.

In some implementations, a user can request to add a new tag via the table/pane 230. For example, in the test case scenario for the car break test of stopping distance, the user may request a test of a specific model tire or a specific weather condition. A similar process as described with respect to FIG. 3C may be carried out to accept the new environment condition(s) (so that these added requests can be used in calculating the coverage map).

Figure 5:
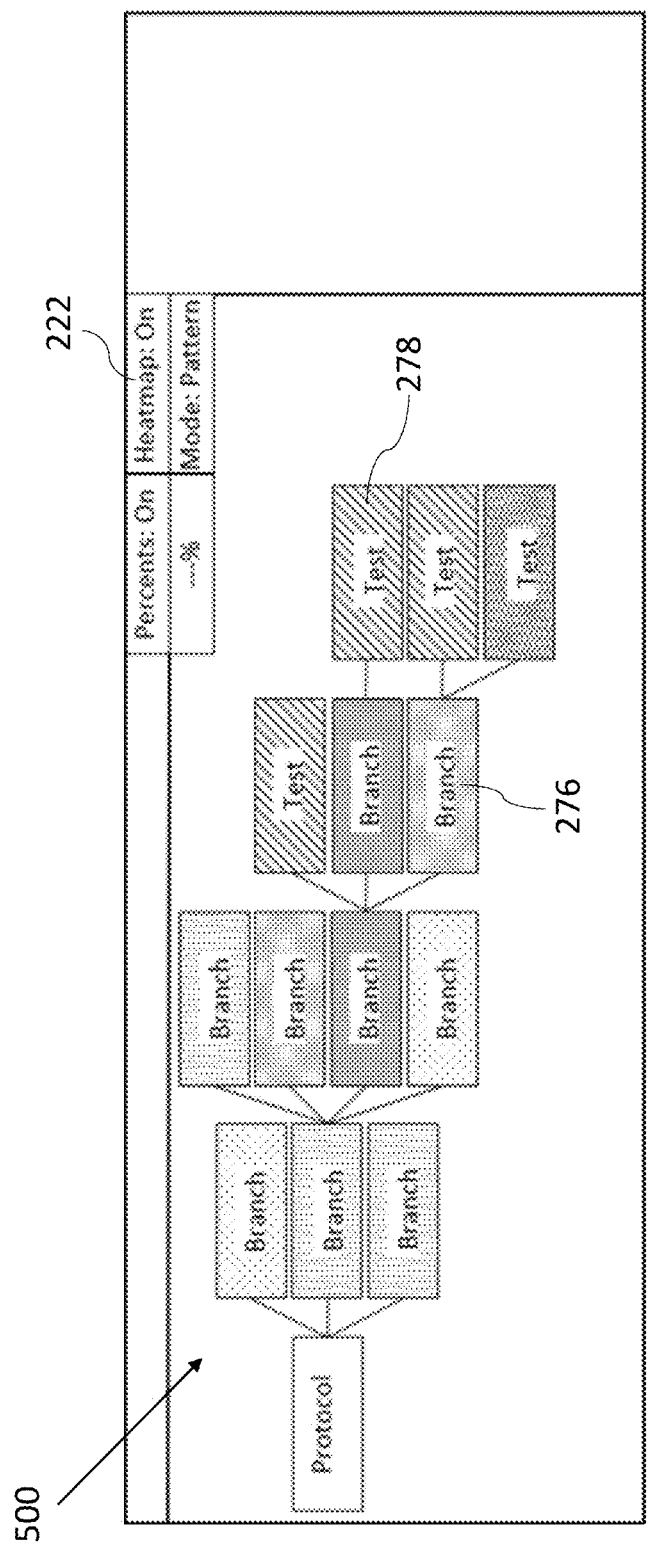
FIG. 5 illustrates an interface demonstrating a heatmap of the test cases.

FIG. 5 illustrates an interface demonstrating a heatmap of the test cases. By providing for display and colorizing a fully expanded test coverage tree to show where tests exist and where test do not exist, it is possible to show a "test heat map". The heatmap 500 can be considered a visualization mode that uses graphical features to differentiate based on usage features, including completion percentage. This mode can be triggered by selecting an option in the program to toggle the view, for example by selection of the heatmap icon 222. When the mode is active, all of the branches can have some visual indicator as to the completion percentage—the percentage of accepted tests for which a completed test exists with respect to the total number of accepted tests—within the branch. The details of calculation for this value can be seen in FIG. 6. This completion percentage can be displayed in a variety of manners, including in the structure representing the box via color, pattern, shape, border or with a direct percentage.

FIG. 5 shows one such possible implementation—a gradient or pattern view that associates the completion percentage with a dot matrix density. As can be seen, the branch 276 that has only one child leaf node that is completed has a denser concentration than the branch 278 immediately beneath it that has one completed and one incomplete accepted test. The heatmap in this example associates a denser concentration with a higher completion percentage, but this relationship can be opposite, with a denser concentration indicating a lower completion percentage. The use of a heatmap or other visualization tool might allow for a quick appraisal of the thoroughness of the test cases in a program with a focus on what users are requesting, rather than every conceivable issue. The completion percentage shown here compares the completed tests to the total number of accepted tests, but the completion percentage can also compare the number of completed tests with the total number of requested tests. The percentage mode is very similar in function to the heatmap, and can be enabled alongside the heatmap visualization mode, and can be enabled in similar ways. Advantageously, the computations can be carried out based on what has been expressly indicated as "important" by a community of users, which can provide a more accurate determination, and which may change for the better or worse over time. Because the coverage data is generated as the test runs, the coverage map generated is live and up to date. This feature supports the ability to have an automated up do date coverage tree.

Figure 6:
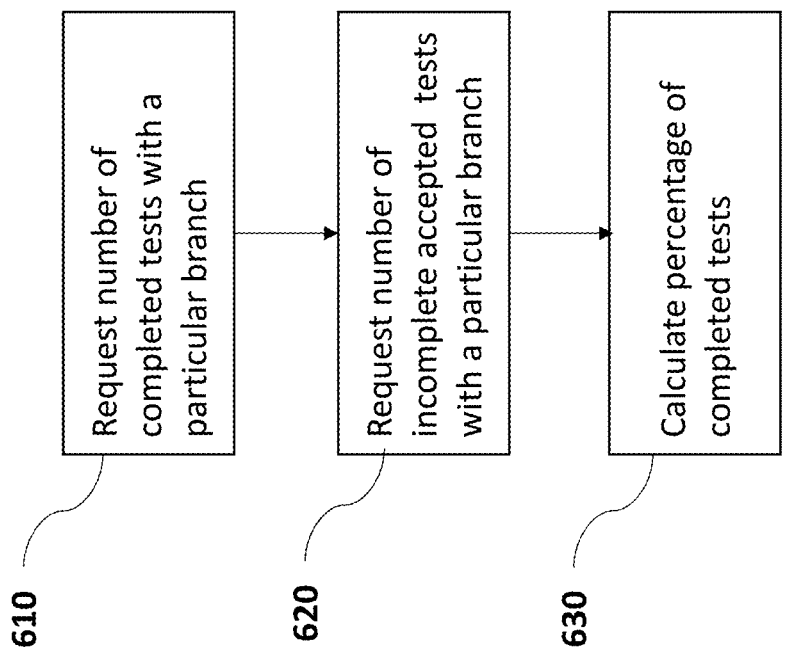
FIG. 6 illustrates the process by which a system can determine completion percentage of a branch.

FIG. 6 illustrates a process by which a system can determine completion percentage of a branch. The process can begin with requesting the total number of completed tests within the branch (610). As mentioned above, an individual functionality test is indicated by the tags on a node. When there are no tags on a node, the system can count that as there being no test. The system can then determine the number of total accepted tests within the branch. The system can determine this number by requesting the number of incomplete accepted tests (620). By adding the number of incomplete accepted tests and completed tests, the system can find the number of total accepted tests within the branch. This number can also be found requesting the total number of accepted tests directly. After the number of total accepted tests is determined, the system can simply divide the number of completed tests by the number of total accepted tests to find completion percentage (630).

Instead of calculating test coverage by using every possible test option for the full product as a baseline, the test coverage is based on the difference between the current tests and the community generated test coverage tree. Thus, at an initial state, test coverage can be at 100% (e.g., the initial value of the completion percentage is 100%). Then, as people add proposed test cases, the test coverage drops until those tests are created and run.

Figure 7:
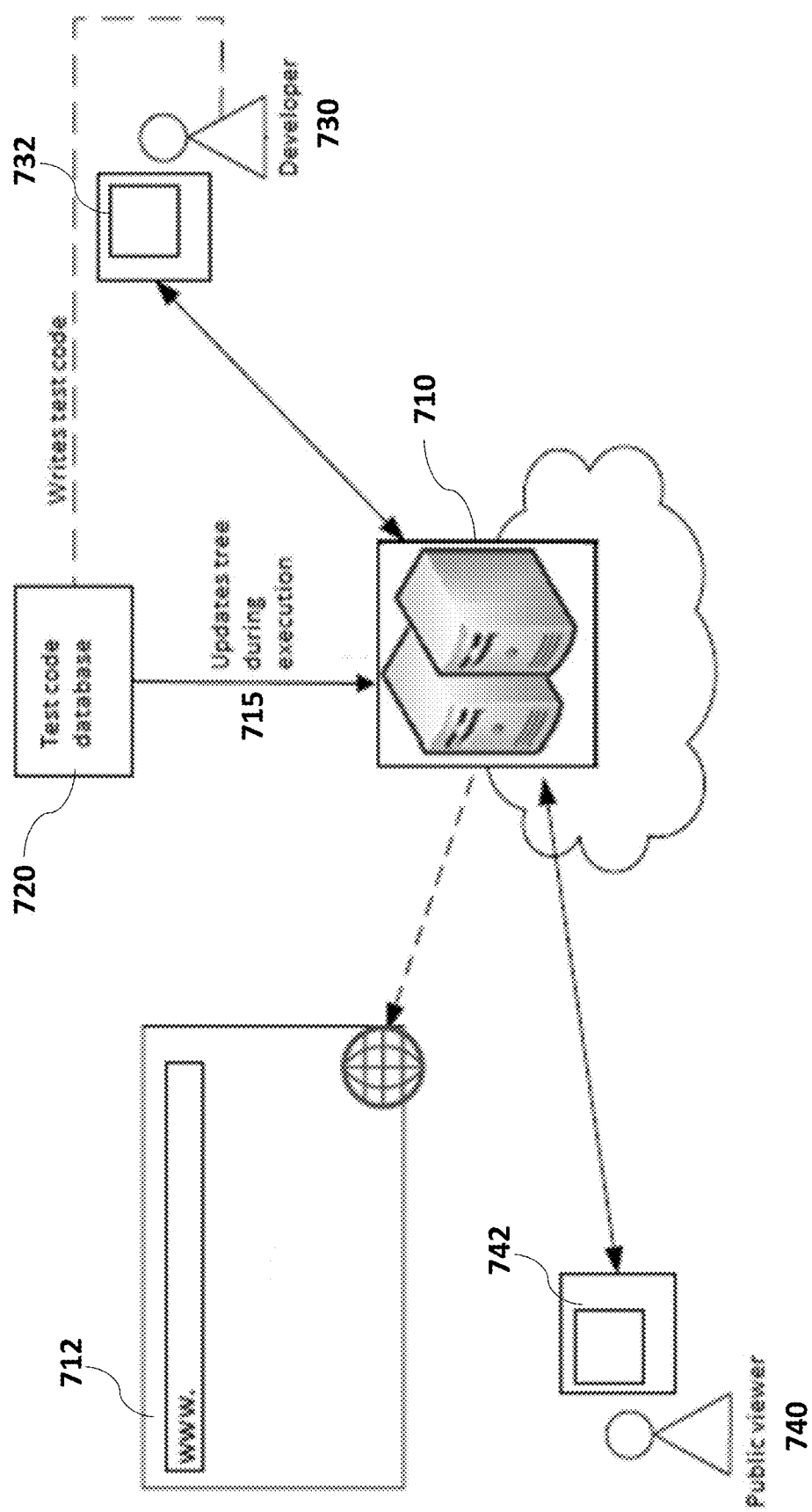
FIG. 7 illustrates an operating environment for transparent test case scenarios.

FIG. 7 illustrates an operating environment for transparent test case scenarios. Referring to FIG. 7, the operating environment can include a coverage server 710 that manages the data structure containing the information about the test case scenarios. The coverage server 710 can manage both community requested test cases and the regularly updated test cases. Coverage server 710 may include or communicate with a web server to host a website 712, application, or other portal to a viewer of the test case tree/coverage map, which may be include functionality as described with respect to FIGS. 2A through 5.

The environment can also include a test code resource 720. This resource can store the test code (and any other relevant information) and can be executed by any suitable computing system. The tests can generate updates/add nodes to the tree at runtime (715), which may be nightly, weekly, at some other interval, manually, or randomly. The resource 720 can contain all of the test cases written for a particular program or set of programs, and the programs themselves may contain methods to write directly to the test case tree in the system. The coverage server 710 receives updates to the tree representation of the test coverage during the test case runtime to generate a test coverage map. The coverage server 710 can provide the test coverage map to a user via, for example, the website 712 or other portal to a view of the test case tree.

The portal can be accessed by users, possibly including different permissions or views. In considering the types of permissions, one set of users can be considered developers 730—programmers, managers, or others internal to the company that produces the program for which the test cases exist. Another set of users can be considered public users 740—this set would encompass everyone else and may also include people who can act as developers acting in a non-official capacity. Public users may require a login or may be able to act anonymously. Both the developers and the public users can access this system through their corresponding computing devices 732, 742 and view in a display. These computing devices can be embodied as described in FIG. 8. Both sets of users can have the same view. This view van be comprised of a visual representation of the completed tree for all test cases, wherein completed tests are visually differentiated from the incomplete accepted tests, as shown in FIG. 2C; an interactive feature for requesting new test cases menu to interactively request test cases during viewing of the tree as shown in FIGS. 3A and 3B; a view of specific test case details as shown in FIG. 4; and a view of an analysis of the tree, which can be comprised of a heatmap of the tree as shown in FIG. 5 and a numerical representation of the completion percentage within branches and sub-branches. One difference between the public users and developers can be with respect to options available for suggested tests. As outlined FIGS. 3A-3D, a public user can suggest a test case and then a developer could have a view for adding received suggested test cases to the completed tree as incomplete accepted tests.

A developer can also interact with the operating environment outside of direct interactions with the system of servers. For instance, a developer can write and commit code to the data resource (720). This can be stimulated by seeing a suggested test case as outlined in FIG. 3C. This code can be written within the viewing system or within a different developer software for test codes.

Figure 8:
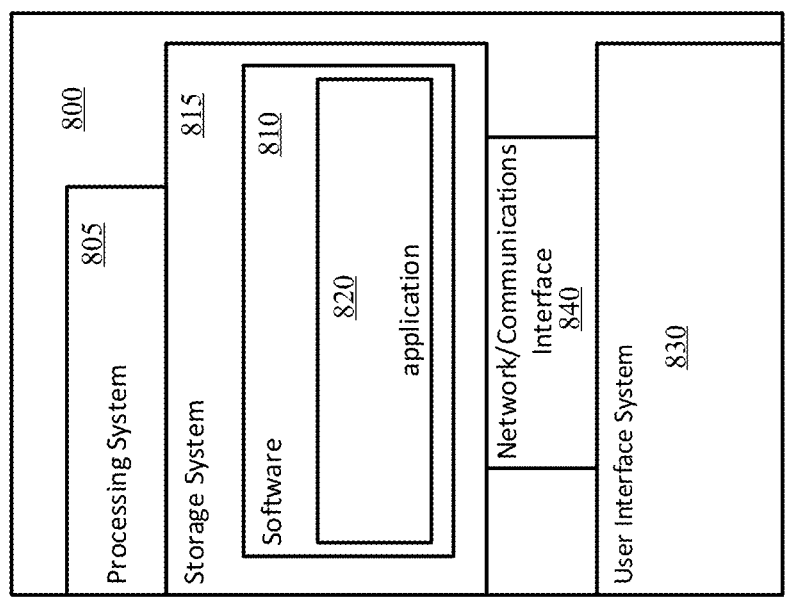
FIG. 8 illustrates components of a computing device that may be used in certain implementations described herein.

FIG. 8 illustrates components of a computing device that may be used in certain implementations described herein.

Referring to FIG. 8, system 800 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 800 may be incorporated to implement a particular computing device.

System 800 includes a processing system 805 of one or more processors to transform or manipulate data according to the instructions of software 810 stored on a storage system 815. Examples of processors of the processing system 805 include general purpose central processing units, application specific processors, and logic devices, as well as any other type of processing device, combinations, or variations thereof. The processing system 805 may be, or is included in, a system-on-chip (SoC) along with one or more other components such as network connectivity components, sensors, video display components.

The software 810 can include an operating system and application programs such as application 820 which can be used to access and interact with a coverage map as described herein.

Storage system 815 may comprise any computer readable storage media readable by the processing system 805 and capable of storing software 810 including the application 820.

Storage system 815 may include volatile and nonvolatile memory, removable and non-removable media implemented in any method or technology for storage of information, such as computer readable instructions, data structures, program modules, or other data. Examples of storage media of storage system 815 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal or carrier wave.

The system can further include user interface system 830, which may include input/output (I/O) devices and components that enable communication between a user and the system 800. User interface system 830 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 830 may also include output devices such as display screen(s), speakers, haptic devices for tactile feedback, and other types of output devices. In certain cases, the input and output devices may be combined in a single device, such as a touchscreen display which both depicts images and receives touch gesture input from the user.

Visual output may be depicted on the display in myriad ways, presenting graphical user interface elements, text, images, video, notifications, virtual buttons, virtual keyboards, or any other type of information capable of being depicted in visual form.

The user interface system 830 may also include user interface software and associated software (e.g., for graphics chips and input devices) executed by the OS in support of the various user input and output devices. The associated software assists the OS in communicating user interface hardware events to application programs using defined mechanisms. The user interface system 830 including user interface software may support a graphical user interface, a natural user interface, or any other type of user interface. For example, the interfaces for the test information and heatmap described herein (e.g., with respect to FIGS. 2A-5) may be presented through user interface system 830.

Communications interface 840 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Figure 9:
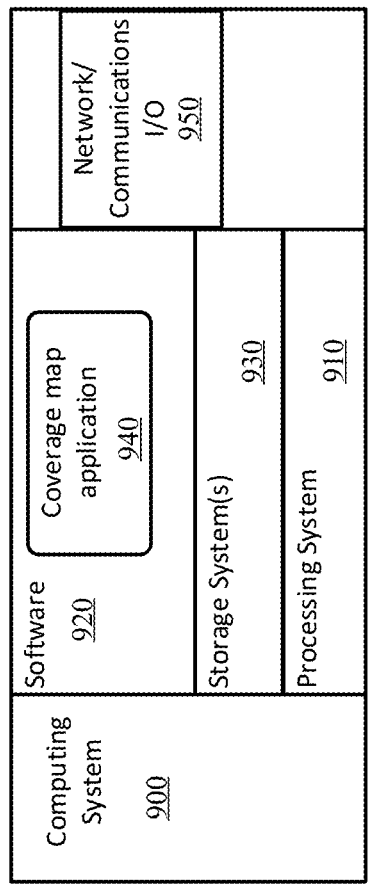
FIG. 9 illustrates components of a computing system that may be used to implement certain methods and services described herein.

FIG. 9 illustrates components of a computing system that may be used to implement certain methods and services described herein. Referring to FIG. 9, system 900 may be implemented within a single computing device or distributed across multiple computing devices or sub-systems that cooperate in executing program instructions. The system 900 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 900 can include a processing system 910, which may include one or more processors and/or other circuitry that retrieves and executes software 905 from storage system 930. Processing system 910 may be implemented within a single processing device but may also be distributed across multiple processing devices or sub-systems that cooperate in executing program instructions.

Examples of processing system 910 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system(s) 930 can include any computer readable storage media readable by processing system 910 and capable of storing software 920 including instructions for coverage map application 940. Storage system 930 may include volatile and nonvolatile memory, removable and non-removable media implemented in any method or technology for storage of information, such as computer readable instructions, data structures, program modules, or other data. Examples of storage media include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case is the storage medium of storage system a transitory propagated signal or carrier wave.

Storage system 930 may be implemented as a single storage device but may also be implemented across multiple storage devices or sub-systems co-located or distributed relative to each other. Storage system 930 may include additional elements, such as a controller, capable of communicating with processing system 910.

Software 920, including 940, may be implemented in program instructions and among other functions may, when executed by system 900 in general or processing system 910 in particular, direct the system 900 or processing system 910 to operate as described herein for a coverage server.

Software 920 may also include additional processes, programs, or components, such as operating system software or other application software. It should be noted that the operating system may be implemented both natively on the computing device and on software virtualization layers running atop the native device operating system (OS). Virtualized OS layers, while not depicted in FIG. 9, can be thought of as additional, nested groupings within the operating system space, each containing an OS, application programs, and APIs.

In embodiments where the system 900 includes multiple computing devices, the system can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 950 may be included, providing communication connections and devices that allow for communication between system 900 and other computing systems (not shown) over a communication network or collection of networks (not shown) or the air.

Certain techniques set forth herein with respect to coverage map management and analysis may be described in the general context of computer-executable instructions, such as program modules, executed by one or more computing devices including holographic enabled devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

By way of example, and not limitation, computer-readable storage media may include volatile and non-volatile memory, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of transitory propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts that would be recognized by one skilled in the art are intended to be within the scope of the claims.

The invention claimed is:

1. A computer-implemented method comprising:
    receiving updates of test information from specific functionality tests during test case runtime of an automated testing of computing systems;
    generating, using the updates of the test information, a tree with nodes and branches that represents a hierarchical ordering of test cases of the specific functionality tests for the computing systems that are grouped into collections of related tests, the tree comprising:
    nodes representing completed tests; and
    nodes representing incomplete accepted tests, wherein the nodes representing completed tests and the nodes representing incomplete accepted tests each include one or more tags to represent a test environment for a piece of functionality for the computing systems;
    providing, for display in an interface, a test coverage map of the tree in a form of a tree representation, wherein certain nodes of the tree are visible in the tree representation to select groups of users;
    receiving a request through interaction with a node of the tree representation in the interface; and
    performing an operation with respect to the tree representation corresponding to the request.

2. The computer-implemented method of claim 1, wherein each update of the test information to the tree representation comprises:
    a node name, a parent node name, and environment information for a test.

3. The computer-implemented method of claim 1, wherein the request is an adding request, the performing of the operation corresponding to the request comprises adding an extra node to the tree representation, the extra node indicating a requested test case and including one or more tags representing a requested test environment of the requested test case.

4. The computer-implemented method of claim 1, wherein the nodes representing completed tests and the nodes representing incomplete accepted tests are colorized to show a heat map in an expanded form of the tree representation.

5. The computer-implemented method of claim 1, further comprising:
calculating a completion percentage of test cases by comparing the number of completed test cases to the number of incomplete accepted test cases.

6. The computer-implemented method of claim 5, further comprising:
providing, in the interface, a numerical representation of the completion percentage within branches and sub-branches of the tree.

7. The computer-implemented method of claim 5, wherein an initial value of the completion percentage is 100%.

8. The computer-implemented method of claim 1, further comprising:
providing, for display in the interface, information on testing environment and/or completion percentage.

9. The computer-implemented method of claim 1, further comprising:
tracking a count of a number of times a particular test environment for a particular piece of functionality is received for representation in the tree during a test period for the test case runtime; and
when the count is greater than 1, automatically adjusting tests to be run during a subsequent test period to remove one or more tests contributing to the count.

10. A coverage server comprising:
one or more processors;
a storage system;
instructions stored on the storage system that when executed by the one or more processors direct the coverage server to at least:
receive updates of test information from specific functionality tests during test case runtime of an automated testing of computing systems;
generate, using the updates of the test information, a tree with nodes and branches that represents a hierarchical ordering of test cases of the specific functionality tests for the computing systems that are grouped into collections of related tests, the tree comprising:
nodes representing completed tests; and
nodes representing incomplete accepted tests, wherein the nodes representing completed tests and the nodes representing incomplete accepted tests each include one or more tags to represent a test environment for a piece of functionality for the computing systems;
provide, for display on an interface, a test coverage map of the tree in a form of a tree representation;
receive a request, via the interface, to add a node to the tree representation; and
in response to the request to add the node to the tree representation, add the node as a requested test case for the automated testing, wherein the node corresponding to the requested test case for the automated testing is visible in the tree representation to select groups of users.

11. The coverage server of claim 10, wherein each update to the tree representation comprises:
a node name, a parent node name, and environment information for a test.

12. The coverage server of claim 10, wherein the nodes representing completed tests and the nodes representing incomplete accepted tests are colorized to show a heat map in an expanded form of the tree representation.

13. The coverage server of claim 10, wherein the instructions further direct the coverage server to:
calculate a completion percentage of test cases by comparing the number of completed test cases to the number of incomplete accepted test cases.

14. The coverage server of claim 13, wherein the instructions further direct the coverage server to:
provide, for display in the interface, a numerical representation of the completion percentage within branches and sub-branches of the tree.

15. The coverage server of claim 13, wherein an initial value of the completion percentage is 100%.

16. The coverage server of claim 10, wherein the instructions further direct the coverage server to:
provide, for display in the interface, information on testing environment and/or completion percentage.

17. The coverage server of any of claim 10, wherein the instructions further direct the coverage server to:
track a count of a number of times a particular test environment for a particular piece of functionality is received for representation in the tree during a test period for the test case runtime; and
when the count is greater than 1, automatically adjust tests to be run during a subsequent test period to remove one or more tests contributing to the count.

18. A storage medium having instructions stored thereon that when executed by a computing system direct the computing system to at least:
receive updates of test information from specific functionality tests during test case runtime of an automated testing of computing systems;
generate, using the updates of the test information, a tree with nodes and branches that represents a hierarchical ordering of test cases of the specific functionality tests for the computing systems that are grouped into collections of related tests, the tree comprising:
nodes representing completed tests; and
nodes representing incomplete accepted tests, wherein the nodes representing completed tests and the nodes representing incomplete accepted tests each include one or more tags to represent a test environment for a piece of functionality for the computing systems;
provide, for display on an interface, a test coverage map of the tree in a form of a tree representation;
receive a request, via the interface, to add a node to the tree representation; and
in response to the request to add the node to the tree representation, add the node as a requested test case for the automated testing, wherein the node corresponding to the requested test case for the automated testing is visible in the tree representation to select groups of users.

19. The storage medium of claim 18, further comprising instructions that direct the computing system to:
provide, for display in the interface, information on testing environment and/or completion percentage.

20. The storage medium of claim 18, further comprising instructions that direct the computing system to:
track a count of a number of times a particular test environment for a particular piece of functionality is received for representation in the tree during a test period for the test case runtime; and when the count is greater than 1, automatically adjust tests to be run during a subsequent test period to remove one or more tests contributing to the count.

* * * * *